T. O. JOHNSON, DEC'D.
J. J. CURRY, ADMINISTRATOR.
CLUTCH.
APPLICATION FILED JUNE 10, 1905.
951,992.
Patented Mar. 15, 1910.
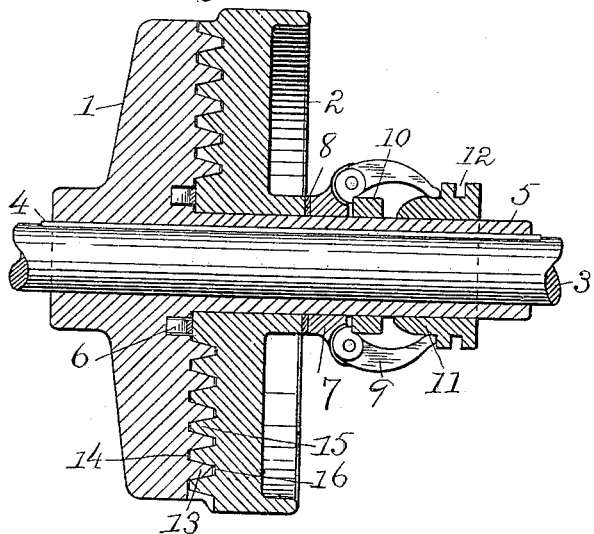
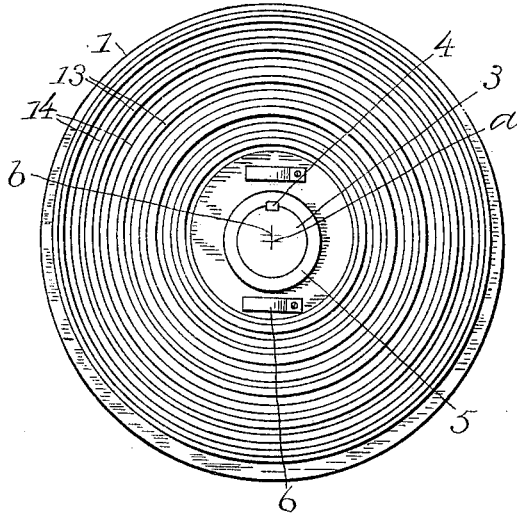
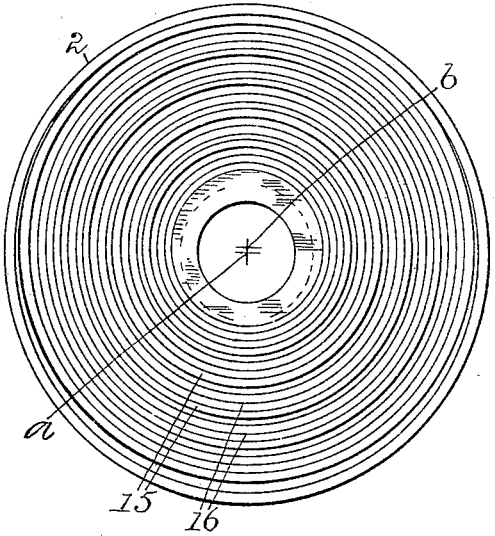
Witnesses:
Inventor.
Thomas O. Johnson,
by Jenkins & Barker
Attorneys.

UNITED STATES PATENT OFFICE.

THOMAS O. JOHNSON, OF HARTFORD, CONNECTICUT; JOHN J. CURRY ADMINISTRATOR OF SAID THOMAS O. JOHNSON, DECEASED.

CLUTCH.

951,992.  Specification of Letters Patent.  Patented Mar. 15, 1910.

Application filed June 10, 1905. Serial No. 264,566.

*To all whom it may concern:*

Be it known that I, THOMAS O. JOHNSON, a citizen of the United States, and a resident of Hartford, in the county of Hartford and State of Connecticut, have invented a new and improved Clutch, of which the following is a specification.

My invention relates to that class of clutches employing an arrangement of interengaging ribs and recesses for the purpose of joining the clutch members, and the object of my invention is to provide a simple and effective clutch for joining or uniting a driving member with a driven member; and a further object of the invention is to provide a device of this class in which there shall be embodied the advantages of both a friction clutch and a positively acting clutch.

A form of device in the use of which these objects may be attained is illustrated in the accompanying drawings in which—

Figure 1 is a view in longitudinal section through a clutch embodying my invention. Fig. 2 is a face view of the driven clutch member showing its sleeve and the shaft in full. Fig. 3 is a face view of the driving clutch member.

In the accompanying drawings the numerals 1 and 2 indicate clutch members that are to be united for the purpose of simultaneous rotation, one of said clutch members receiving power applied to the other clutch member. The device may be arranged so that power may be applied to either clutch member and thus translate it to the opposite clutch member. In the form of device herein shown the clutch member 2 is designed to receive the power which is translated thereby from said clutch part or driving member to the clutch part or driven member 1. This driving member is formed in the shape of a pulley and may receive its power as by means of a belt from any suitable source, the object of the device herein shown being to translate such power for the purpose of rotating the shaft 3. The driven member 1 is splined or keyed to the shaft 3 by a spline or key 4, this spline or key being arranged so that the clutch member 1 may have some little movement lengthwise of the shaft, although such construction is not absolutely essential. The driven member 1 has a sleeve 5 projecting from one face and arranged to fit the shaft 3, the spline or key 4 preferably extending lengthwise through this sleeve. The driving member or pulley 2 is mounted to rotate on the sleeve 5 and springs 6 may be employed for forcing the clutch members away from each other.

Any form of shipping device may be used for forcing the clutch members into engagement. In the form of device herein shown a support 7 is secured to the hub of the pulley or driving member 2. This support may be formed of a separate piece as shown with a disk 8 between the support and hub of the shaft, if desired, or the support may be formed integral with the hub of the pulley. Clamping levers 9 are pivoted in the supports 7, one end of these levers acting against a flange or collar 10 secured to the sleeve 5, and the opposite ends of said levers resting against a shipping wedge 11 provided with a groove 12 for the reception of the forked arm of a shipping lever common to devices of this class for giving the wedge a lengthwise movement along the sleeve for the purpose of operating the clamping levers 9.

The means for moving the disks into and out of engagement with each other herein described is of a well-known form and constitutes no part of my invention, this means for moving the disks having been shown simply for the purpose of illustrating the invention.

Each of the disks 1 and 2 is provided with ribs and grooves, the ribs upon one of the disks being arranged to project into the grooves in the opposite disk. The ribs on the disk 1 are denoted by the numeral 13 and the grooves by the numeral 14, while the ribs on the disk or driving member 2 are indicated by the numeral 15 and the grooves by the numeral 16. The ribs and grooves on each of the disks 1 and 2 are eccentrically formed with respect to the axis $a$ of rotation of the shaft 3, on which axis the disks are relatively moved to engage the clutch parts. This axis of rotation for engaging the clutch parts is preferably, and is shown to be herein, the axis of rotation of the shaft 3, although such construction is not absolutely essential. These ribs and grooves need not be eccentric to a great degree, in the devices herein shown they are formed from the center *b* shown in Figs. 2 and 3 of the drawings. It will thus be obvious that when the two disks are forced together lengthwise of the shaft 3 the eccentric arrangement of the ribs and grooves will cause the parts to be positively locked to rotate together. This arrangement while providing for a positive lock for the clutch parts has many advantages of a friction clutch for the reason that when the two disks are closed together there is not a shock as in the forms of positive clutches, but the ribs and grooves gradually bind and wedge the two disks in engagement much in the same manner as in the ordinary form of friction clutches.

While both of the disks herein are shown as provided with eccentrically formed ribs and grooves such construction is not essential to my invention, and while such form is preferable, it is sufficient if one of the disks be provided with the eccentrically formed ribs and grooves.

It will be noted that the two clutch parts are caused to bind and engage each other by reason of the wedging action of what may be termed the circumferential surface of the shoulders upon the ribs, that is, that surface extending circumferentially or in the direction of rotation of the disks.

This construction of ribs and grooves provides shoulders upon the two clutch parts, which shoulders at some point are located at a greater distance from the axis of rotation than at other parts so that in a movement of one of the clutch parts with respect to the other in a circumferential direction the two parts are bound firmly together. The arrangement of the shoulders for thus causing the binding action may be attained in different ways, and I do not therefore limit my invention to the precise construction herein shown and described.

What I claim as my invention and desire to secure by Letters Patent is:—

1. A driving and a driven member constituting clutch members and having upon their meeting surfaces an intermeshing rib and groove providing engaging shoulders upon said members and so arranged that one of the shoulders is moved radially on a relative rotation of the two members whereby a wedging of the shoulders in a circumferential direction is obtained to securely bind said parts together, and means for moving the clutch members toward each other.

2. A driving and a driven member constituting clutch parts and having upon their meeting surfaces a rigidly supported rib and groove forming shoulders upon said members so arranged that one is moved radially with respect to the other whereby a wedging action in a circumferential direction is obtained to securely bind said parts together, and means for moving the clutch parts toward each other.

3. A driving and a driven member constituting clutch parts and having upon their meeting surfaces an intermeshing rib and groove extending for a substantial distance about the members and providing interengaging shoulders, one arranged to be moved radially with respect to the other whereby a wedging action in a circumferential direction is obtained to securely bind said parts together, and means for moving the clutch parts toward each other.

4. A driving and a driven member constituting clutch parts and having upon their meeting surfaces circularly formed intermeshing ribs and grooves providing engaging shoulders of a length equal to a turn about the disk, one of said ribs being arranged to move radially with respect to another whereby a wedging action in a circumferential direction is obtained to bind the parts firmly together, and means for moving the clutch parts toward each other.

5. A driving and a driven member having upon their meeting surfaces intermeshing ribs and grooves, said ribs and grooves being eccentrically arranged to the axis of rotation of the driving and driven members, and means for forcing the driving and driven members toward each other.

6. A driving and a driven member having upon their meeting surfaces intermeshing ribs and grooves, said ribs and grooves forming shoulders, said shoulders at some part being located a greater distance from the axis of rotation of said members than at another part, and means for forcing the driving and driven members toward each other.

7. The combination with a driving member having upon its face a rib encircling the axis of rotation of said member and located at one part at a greater distance from the axis of rotation than at another part, of a driven member having upon its face a rib encircling the axis of rotation of said member and located at one part at a greater distance from the axis of rotation than at another part and located for engaging the said rib on the driving member throughout its length, and means for holding said ribs in engagement.

8. A driving and a driven member having upon their meeting surfaces intermeshing ribs and grooves, said ribs and grooves forming shoulders, each of said shoulders at some part being located a greater distance from the axis of rotation of said members than at another part, the shoulders on each member being so located relative to the shoulders on the other member that when said ribs and grooves are intermeshing the shoulders throughout the entire faces of both members will be in driving engagement, and means for holding the ribs and grooves of the members in engagement.

THOMAS O. JOHNSON.

Witnesses:
ARTHUR B. JENKINS,
PATRICK J. CURRY.